United States Patent
Toyosawa et al.

(10) Patent No.: US 10,464,167 B2
(45) Date of Patent: Nov. 5, 2019

(54) LASER IRRADIATION APPARATUS

(71) Applicant: TOYOKOH Co., Ltd., Fuji-shi, Shizuoka (JP)

(72) Inventors: Kazuaki Toyosawa, Fuji (JP); Akihiro Kuroyanagi, Fuji (JP); Kazuhisa Fujita, Hamamatsu (JP); Shinichiro Okihara, Hamamatsu (JP)

(73) Assignee: TOYOKOH CO., LTD., Shizuoka (JP)

( * ) Notice: Subject to any disclaimer, the term of this patent is extended or adjusted under 35 U.S.C. 154(b) by 380 days.

(21) Appl. No.: 15/310,207

(22) PCT Filed: Jul. 13, 2015

(86) PCT No.: PCT/JP2015/069986
§ 371 (c)(1),
(2) Date: Nov. 10, 2016

(87) PCT Pub. No.: WO2016/009978
PCT Pub. Date: Jan. 21, 2016

(65) Prior Publication Data
US 2017/0252862 A1 Sep. 7, 2017

(30) Foreign Application Priority Data
Jul. 15, 2014 (JP) .................. 2014-145087

(51) Int. Cl.
*B23K 26/082* (2014.01)
*B23K 26/08* (2014.01)
*B23K 26/16* (2006.01)
*B23K 26/06* (2014.01)
(Continued)

(52) U.S. Cl.
CPC ........ *B23K 26/082* (2015.10); *B23K 26/0648* (2013.01); *B23K 26/0652* (2013.01);
(Continued)

(58) Field of Classification Search
CPC ...... B23K 26/08; B23K 26/16; B23K 26/082; B23K 26/14; B23K 26/0652; B23K 26/10; B23K 26/0648
(Continued)

(56) References Cited

U.S. PATENT DOCUMENTS 3,799,657 A * 3/1974 Dager .................... B23K 26/08
359/814
5,237,150 A * 8/1993 Karube .............. B23K 26/0643
219/121.72
(Continued)

FOREIGN PATENT DOCUMENTS

JP 05185265 A * 7/1993
JP 08206864 A * 8/1996
(Continued)

OTHER PUBLICATIONS

International Search Report—PCT/JP2015/069986—dated Oct. 6, 2015.
(Continued)

*Primary Examiner* — Ibrahime A Abraham
*Assistant Examiner* — John J Norton
(74) *Attorney, Agent, or Firm* — Young & Thompson

(57) ABSTRACT

This is to provide a laser irradiation apparatus which can drive a deflection optical system (33) with a high speed by a small and lightweight structure and can cope with heat generation of the optical system. The laser irradiation apparatus includes a condensing optical system (32) for condensing a laser beam (B) generated by a laser oscillator (10) at a predetermined focal point (FP), a deflection optical system (33) for deflecting the laser beam (B) generated from the condensing optical system (32) with a predetermined deflection angle, and a driving unit (100) for rotationally driving the deflection optical system (33) around a rotation axis provided substantially in parallel to an optical axis of the condensing optical system (32), wherein the driving unit (100) has an air motor (100) which convert an energy possessed by a gas supplied from a gas supplying source (60) to a rotational force.

20 Claims, 13 Drawing Sheets

(51) Int. Cl.
  *B23K 26/10* (2006.01)
  *B23K 26/14* (2014.01)
(52) U.S. Cl.
  CPC .............. *B23K 26/08* (2013.01); *B23K 26/10* (2013.01); *B23K 26/14* (2013.01); *B23K 26/16* (2013.01)
(58) Field of Classification Search
  USPC ......................................................... 359/820
  See application file for complete search history.

(56) References Cited

U.S. PATENT DOCUMENTS

| | | | | |
|---|---|---|---|---|
| 7,009,141 | B1 * | 3/2006 | Wool | B23K 26/0096 219/121.73 |
| 2003/0132210 | A1 * | 7/2003 | Fujii | B23K 26/123 219/121.84 |
| 2012/0037604 | A1 * | 2/2012 | Shikata | G02B 7/008 219/121.67 |

FOREIGN PATENT DOCUMENTS

| | | | |
|---|---|---|---|
| JP | 10180477 | A * | 7/1998 |
| JP | 2000-141070 | | 5/2000 |
| JP | 2000141070 | A * | 5/2000 |
| JP | 2003-311455 | | 11/2003 |
| JP | 2003311455 | A * | 11/2003 |
| JP | 2012-250260 | | 12/2012 |
| JP | 2012250260 | A * | 12/2012 |
| WO | 2013/133415 | | 9/2013 |

OTHER PUBLICATIONS

Supplementary European Search Report issued in Application No. 15821372.8, dated Mar. 15, 2018 (all references cited in the Supplementary European Search Report were cited in the IDS filed Nov. 10, 2016).

* cited by examiner

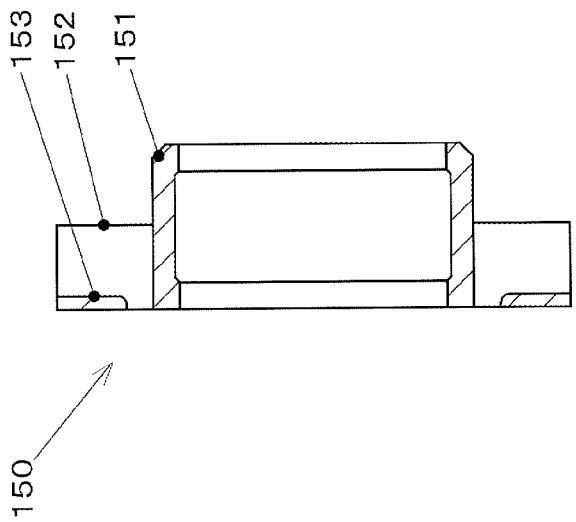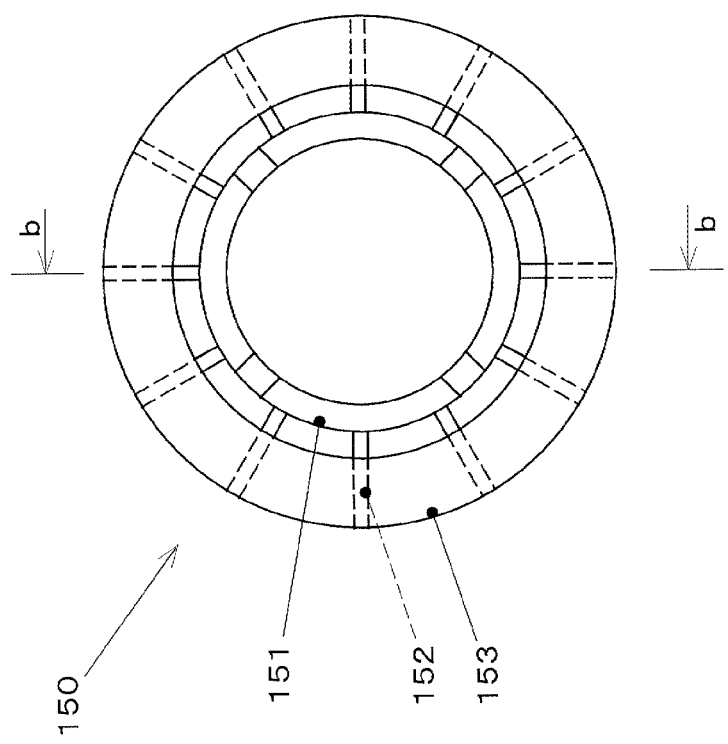

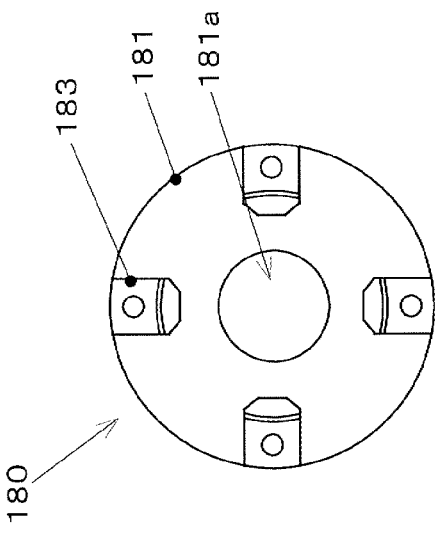
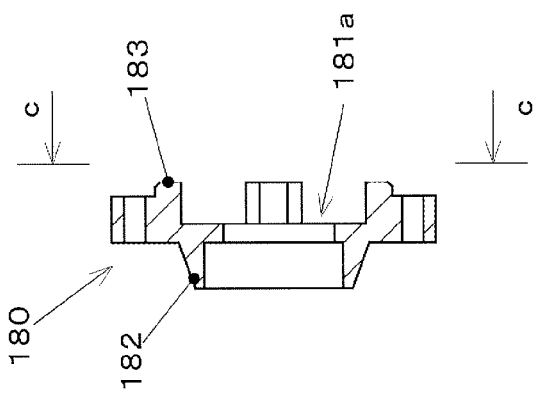
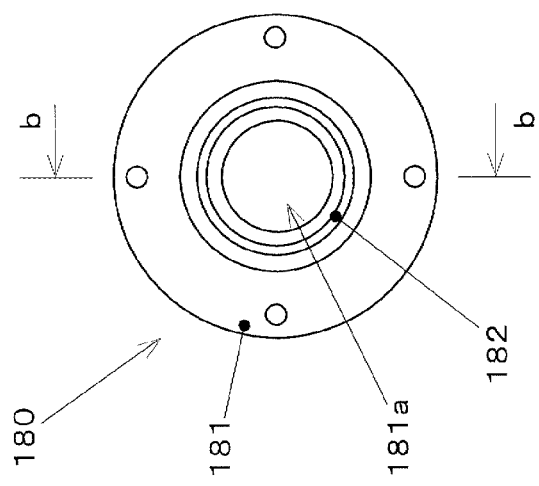

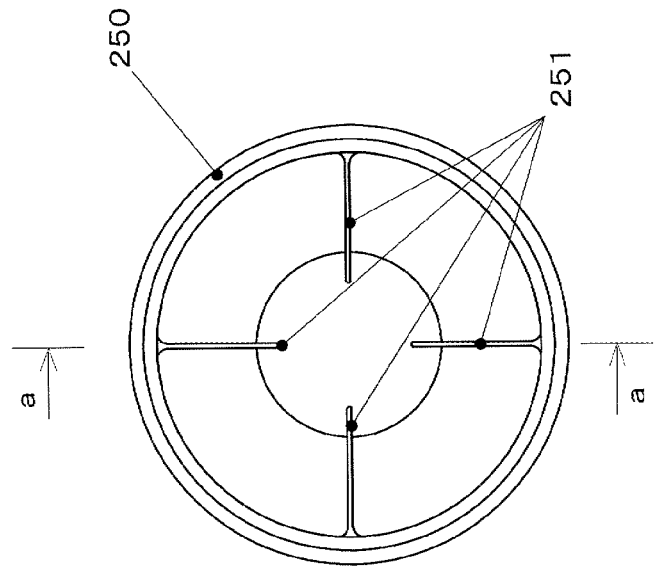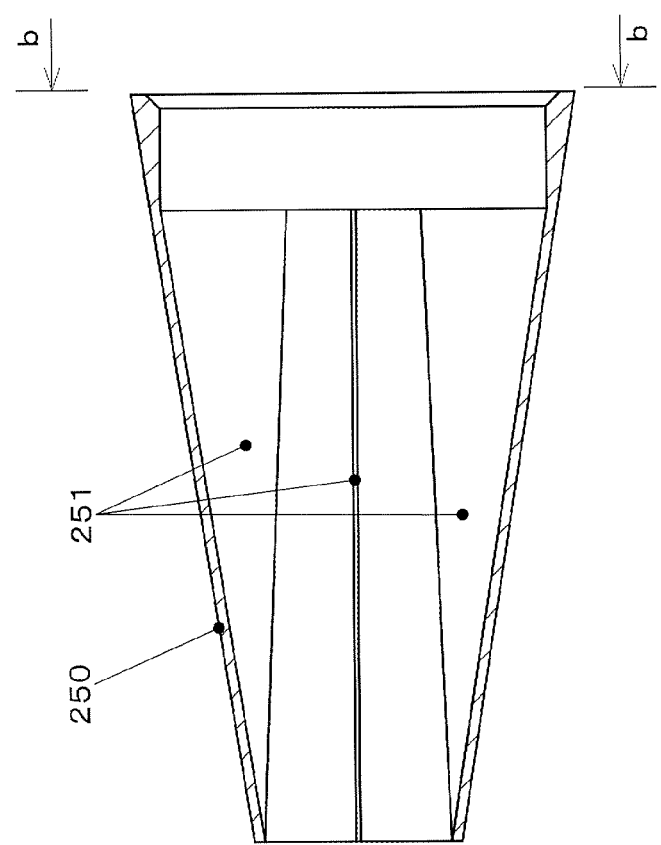

LASER IRRADIATION APPARATUS

TECHNICAL FIELD

The present invention relates to a laser irradiation apparatus, in particular, to an apparatus which can drive a deflection optical system with a high speed by a small and lightweight structure, and can cope with heat generation of the optical system.

BACKGROUND ART

In a structure such as a bridge made of a steel, etc., for example, it is required to constantly peel off and remove the coating, and subjecting to recoating thereof.

Such peeling of the coating has heretofore been generally carried out by utilizing sandblasting, a coating releasing agent, a mechanical tool (sander), etc., but in recent years, it has been proposed to irradiate a laser beam to the surface of the structure to peel off and remove the coating film by breaking.

For example, in Patent document 1, there is disclosed a laser irradiation apparatus in which a condensing optical system for condensing a laser beam with a predetermined focal point to a portable laser head to which the laser beam is transmitted through a fiber by a continuous oscillation type laser oscillator is provided, and the focal point of the laser beam is to scan on the surface of the object to be irradiated while turning in a circular arc by rotationally driving a polarizing optical system which deflects the laser beam with a predetermined deflection angle.

PRIOR ART DOCUMENT

Patent Document

Patent document 1: WO 2013/133415A1

SUMMARY OF THE INVENTION

Problems to be Solved by the Invention

As in the technique disclosed in Patent document 1, by rotationally driving a polarizing optical system such as wedge prisms, etc., even when a CW laser is used as a light source, it can be prevented from being irradiated the laser continuously to the same point of the object to be irradiated, whereby a damage of the surface to be irradiated by heat, etc., can be prevented.

In such a deflection optical system, for example, a laser head can be constituted in a compact size by storing it in an inner diameter side of the so-called hollow motor in which periphery of a rotational central axis of the motor is made hollow.

However, in order to improve processing ability by improving a scanning performance, when a deflection optical system is driven with a high speed of, for example, 10,000 rpm or more, it is necessary to use an apparatus with a large diameter to ensure sufficient output and torque in an electromagnetic motor driving the motor by an electric power, whereby the laser head becomes a large-sized and the weight thereof is also increased.

Also, in such a laser head, in addition to heat generation of the electromagnetic motor itself, there is sometimes a case where an optical element such as a lens, a prism, etc., generates heat by receiving a laser beam, and in the case of the electromagnetic motor, the performance of the magnetic substance is lowered by high temperature deterioration (high temperature demagnetization).

In view of the above-mentioned problems, an object of the present invention is to provide a laser irradiation apparatus which can drive a deflection optical system with a high speed by a small and lightweight structure, and can cope with heat generation of the optical system.

Means to Solve the Problems

The present invention solves the above-mentioned problems by the solving means mentioned below.

The invention according to one embodiment is directed to a laser irradiation apparatus which comprises a condensing optical system for condensing a laser beam generated by a laser oscillator at a predetermined focal point, a deflection optical system for deflecting the laser beam generated from the condensing optical system with a predetermined deflection angle, and a driving means for rotationally driving the deflection optical system around a rotation axis provided substantially in parallel to an optical axis of the condensing optical system, wherein the driving means has an air motor which converts an energy possessed by a gas supplied from a gas supplying source into a rotational force.

Incidentally, "air motor" means a pressure motor (a machine which converts an energy possessed by a gas supplied from a gas supplying source into a rotational force) in general which generates a rotational force using a gas as an operating fluid.

According to this constitution, by using an air motor (an air turbine) for driving the deflection optical system, the driving means can be made small and light, and it is possible to configure the apparatus compact.

In addition, since it is not necessary to use a magnetic substance as in the electromagnetic motor, even when it is heated by heat generated by an optical element, etc., no deterioration of efficiency by demagnetization is generated.

In another embodiment, the air motor has a swirling flow forming portion which forms a swirling flow swirling around the rotation axis by a gas supplied from the gas supplying source, and a rotor which is rotationally driven by the swirling flow, a central part including the rotational central axis of the swirling flow forming portion and the rotor is made hollow, and the laser beam passes through the central part of the swirling flow forming portion and the rotor.

According to this constitution, the air motor is made an annular hollow motor driven by the swirling flow, and an optical path of the laser beam is provided at the central part, whereby the apparatus can be configured more compact.

In a further embodiment, at least part of optical elements of the deflection optical system is provided at an inner diameter side of the hollow-formed rotor.

According to this constitution, at least part of the optical elements is stored at an inner diameter side of the rotor, the apparatus can be configured more compact.

In yet another embodiment, at least part of the air motor and the deflection optical system is detachable as an integrated unit from other portions.

According to this constitution, the deflection optical system which is easily consumable by burnout, etc., at the time of laser irradiation is made detachable with the air motor, whereby it is possible to carry out the exchange work readily.

In yet a further embodiment, the rotor has a plural number of blades which are arranged radially and generate a rotational force by receiving the swirling flow, and the blades are arranged separately from the swirling flow forming portion in the rotation axis direction.

According to this constitution, it is possible to act the swirling flow uniformly to the plural number of the blades dispersed in the peripheral direction, and can suppress noises.

In a further possibility, the air motor includes an optical path through which the laser beam passes and an exhaust is discharged into the space part nearer to the side of the object to be irradiated than the deflection optical system.

According to this constitution, the exhaust of the air motor is discharged to the side nearer to the object to be irradiated than the deflection optical system, floating materials peeled off from the object to be irradiated by laser irradiation can be prevented from attaching to the deflection optical system by floating to this side.

In addition, by excluding the floating materials from the optical path of the laser beam, an energy reached to the object to be irradiated is heightened, and the processing ability can be improved.

As another alternative, the apparatus has an air guiding means for guiding the exhaust of the air motor to an optical element contained in at least one of the deflection optical system and the condensing optical system.

According to this constitution, it is possible to effectively cool the optical element by a simple constitution utilizing the exhaust of the air motor, whereby burnout or deterioration of the optical element can be prevented.

In one embodiment, the apparatus has a suction means for sucking a material to be removed which generates when the laser beam is irradiated to the object to be irradiated.

According to this constitution, it can be prevented to contaminate the environment from floating the material to be removed around the apparatus or to adhere the same to the optical element by invading the inside of the apparatus, etc.

In another embodiment, the apparatus has a rotation speed sensor for detecting a rotation speed of the air motor, and an irradiation inhibiting means for inhibiting irradiation of the laser beam when the rotation speed is out of a predetermined normal range.

According to this constitution, as in the case where the air motor is stopped, or it is not normally rotated, it can be prevented from generating damages such as burnout and erosion, etc., which are caused by feeding a high energy continuously to a part of the object to be irradiated by irradiating the laser beam.

In a further embodiment, the apparatus has a rotation speed sensor for detecting a rotation speed of the air motor, and a controlling means for feedback controlling the gas supplying source so that the rotation speed is close to a target rotational speed previously set.

According to this constitution, the laser beam can suitably maintain the speed of scanning the object to be irradiated, and good processing performance can be obtained.

In yet another embodiment, the apparatus has a duct which is formed in a cylindrical shape projected to the deflection optical system at the side of the object to be irradiated, the laser beam irradiated from the deflection optical system being passed through an inner diameter side thereof and the exhaust of the air motor being introduced therein, and a plural number of stabilizers projected from an inner peripheral surface of the duct to an inner diameter side and extended along a central axis direction of the duct are formed along a peripheral direction of the duct.

According to this constitution, as a result of forming a swirling flow by the exhaust of the air motor along the inner peripheral surface of the duct, a pressure at the region in the vicinity of a shaft center becomes relatively low as compared to the outer peripheral side, it is prevented from being sucked foreign substances to the optical system side, and contamination or deterioration of the optical system can be suppressed.

In yet a further embodiment, the duct is inserted into an inner diameter side of an outer cylinder formed in a cylindrical shape, and the apparatus has a suction means for sucking the material to be removed generating at a time of irradiating the laser beam to the object to be irradiated from a gap between an outer peripheral surface of the duct and an inner peripheral surface of the outer cylinder.

According to this constitution, by sucking the material to be removed due to the outer cylinder provided at the outer diameter side of the duct, the above-mentioned effects can be more improved.

EFFECTS OF THE INVENTION

As explained above, according to the present invention, it can be provided a laser irradiation apparatus which can drive the deflection optical system with a high speed by the small and lightweight structure, and can cope with heat generation of the optical system.

BRIEF DESCRIPTION OF THE DRAWINGS

FIG. 8 is a two-directional drawing of the runner in the air motor of FIG. 3.

FIG. 10 is a two-directional drawing of the lens cap in the air motor of FIG. 3.

FIG. 13 is a part drawing of an inner duct in the laser irradiation apparatus of FIG. 11.

EMBODIMENTS TO CARRY OUT THE INVENTION

In the present invention, the task to provide a laser irradiation apparatus which can drive a deflection optical system with a high speed by a small and lightweight structure, and can cope with heat generation of the optical system is solved by driving the deflection optical system with a hollow swirling type air motor.

EXAMPLE 1

In the following, the laser irradiation apparatus of Example 1 to which the present invention has been applied is explained.

The laser irradiation apparatus and the surface treatment method of Example 1 are, for example, suitable for a peeling treatment of a coating of a bridge made of a steel, etc., but the object to be treated is not limited thereto.

Figure 1:
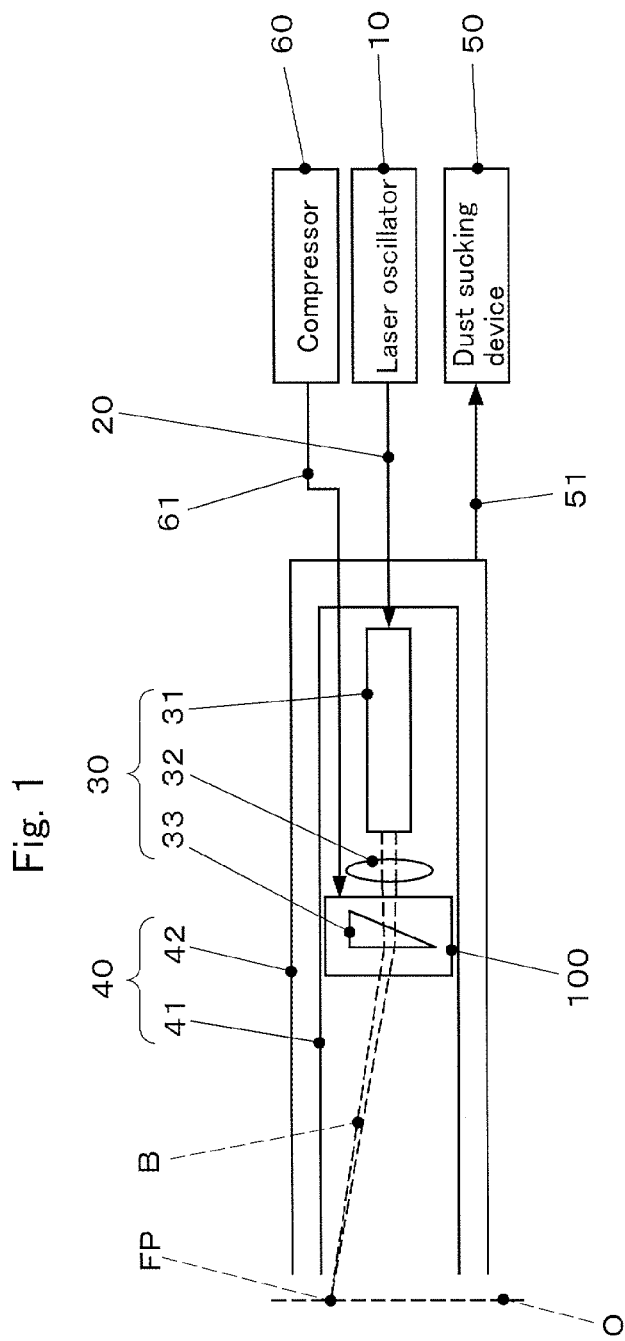
FIG. 1 is a schematic drawing showing the constitution of the laser irradiation apparatus of Example 1 to which the present invention has been applied.

FIG. 1 is a schematic drawing showing the constitution of the laser irradiation apparatus of Example 1.

The laser irradiation apparatus 1 is constituted by having a laser oscillator 10, a fiber 20, a laser irradiation unit 30, a housing 40, a dust sucking device 50, a compressor 60, and an air motor 100, etc.

The laser irradiation unit 30, the housing 40, and the air motor 100 are held by an operator's hand(s) or a conveying apparatus such as a robot arm, etc., and by relatively moving to the object to be irradiated while irradiating a beam B comprising a laser beam, whereby a laser head H for scanning the surface to be irradiated is constituted.

The laser oscillator 10 is a light source constituted by having an excitation source, a laser medium, and an optical resonator, etc.

The laser oscillator 10 may be either of a continuous oscillation (CW) type or a pulse oscillation type and may be used, for example, an arc lamp, a flash lamp, etc.

In addition, depending on the light source to be used, a driving means for driving by adding an excitation current may be provided.

As the laser medium, a solid laser (a ruby laser, a YAG laser, etc.) or a semiconductor laser (a laser diode) is preferably employed.

In particular, it is preferred to use a fiber laser as the solid laser.

Incidentally, the laser medium is not particularly limited, and as the others, a gas laser (a CO2 laser, an excimer laser, etc.), a liquid laser (a dye laser), etc., may be utilized.

The fiber 20 is to transmit the laser beam generated by the laser oscillator 10 to a laser irradiation unit 30 of the laser head H.

The fiber 20 is constituted by forming a coating for reinforcement or protection around the optical fiber in which a clad is coated around a core.

The fiber 20 has flexibility so as not to interfere scanning of the object to be irradiated by the laser head H.

The laser irradiation unit 30 is arranged adjacent to the object to be irradiated, and is to irradiate the laser beam generated by the laser oscillator 10 and transmitted by the fiber 20 to the object O to be irradiated as the beam B.

The laser irradiation unit 30 is constituted by having a fiber connecting portion 31, a condensing optical system 32, and a deflection optical system 33, etc.

The fiber connecting portion 31 is connected to an end part of the fiber 20 at the laser head H side, and guides the transmitted laser beam to the condensing optical system 32.

At the fiber connecting portion 31, a collimate optical system which is to make the laser beam incident from the fiber 20 a parallel beam is provided.

The condensing optical system 32 is a device for focusing the laser beam which is made a parallel beam by the collimate optical system of the fiber connecting portion 31 so as to converge at the predetermined focal point FP.

The condensing optical system 32 is constituted by having, for example, a plurality of lenses, and a part thereof is supported by a support member (a lens cylinder 140) mentioned later which is common to the deflection optical system 33, and is rotationally driven by the air motor 100 with the deflection optical system 33.

The deflection optical system 33 is to deflect the laser beam emitted from the condensing optical system 32 with a predetermined deflection angle.

The deflection optical system 33 is constituted by having, for example, a wedge prism.

The deflection optical system 33 is rotationally driven with a predetermined rotation speed by the air motor 100 which is a power source for driving, around the rotation axis arranged substantially in parallel to an optical axis of the condensing optical system 32.

The housing 40 is a container state member in which the laser irradiation unit 30, and the air motor 100, etc., are stored, and becomes a housing constituting an exterior part of the laser head H.

The housing 40 is formed by, for example, subjecting to injection molding of a resin-based material.

The housing 40 is formed by having an inner cylinder 41 and an outer cylinder 42.

The inner cylinder 41 is a cylindrical member having a central axis substantially concentric with the optical axis (the rotation axis of the air motor 100) of the condensing optical system 32.

The laser irradiation unit 30 and the air motor 100 are stored at the inner diameter side of the inner cylinder 41.

The end part of the inner cylinder 41 at the side of the object to be irradiated is opened, and the beam B is irradiated to the object to be irradiated passing through the opening.

The outer cylinder 42 is a cylindrical portion arranged substantially concentric with the inner cylinder 41.

The inner cylinder 41 is inserted into the inner diameter side of the outer cylinder 42, and the outer peripheral surface of the inner cylinder 41 and the inner peripheral surface of the outer cylinder 42 are arranged opposite to each other at predetermined intervals.

In the vicinity of the end part of the peripheral portion of the outer cylinder 42 at the side of the object to be irradiated, an opening (a through hole) which is not shown is optionally formed to prevent the laser head H from being adsorbed to the object to be irradiated by a suction force of the dust sucking device 50.

The end part of the outer cylinder 42 at the side of the object to be irradiated is opened, and the floating materials peeled off from the object to be irradiated by the irradiation of the beam B, for example, a fragment of a coating film, rust, dust, etc., are absorbed from a gap between the inner cylinder 41 and the outer cylinder 42 and recovered.

The dust sucking device 50 is a device to recover the floating materials from the gap between the inner cylinder 41 and the outer cylinder 42 by sucking an air from an inside of the outer cylinder 42 of the housing 40 through a suction hose 51.

The dust sucking device 50 is constituted by having, for example, a gas suction means such as a centrifugal turbo blower, etc., a treatment chamber for treating sucked substances, and a filter, etc.

The compressor 60 is a device for rotationally driving the air motor 100 by supplying a compressed air to the air motor 100 through a supply hose 61.

As the compressor 60, for example, a displacement type one may be used.

Also, a pressure regulator which is not shown for controlling a supplied pressure may be provided at the pipeline supplying the compressed air from the compressor 60 to the air motor 100.

The air motor 100 is an actuator for rotationally driving a polarizing optical system 33 of the laser irradiation unit 30 using the compressed air supplied from the compressor 60.

The air motor 100 is an annular swirling type hollow motor in which a central part including the rotational central axis is made hollow.

The air motor 100 is detachable from the other parts of the laser head H in the state of holding the deflection optical system 33 of the laser irradiation unit 30 to make exchange of the deflection optical system 33 at the time of burnout easy.

The constitution and operation of the air motor 100 are explained in detail later.

Figure 2:
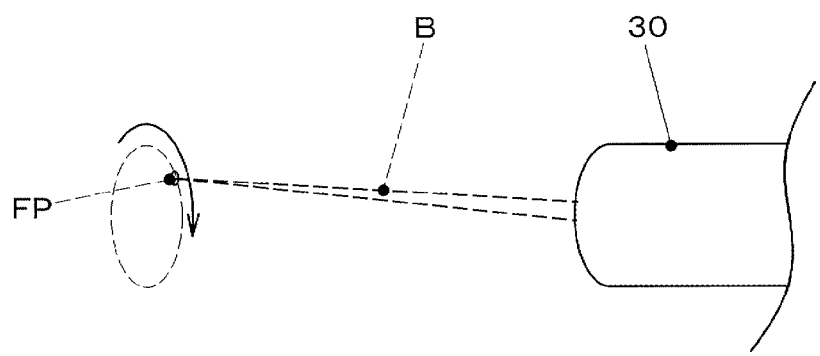
FIG. 2 is a schematic drawing showing behavior of the beam in the laser irradiation apparatus of Example 1.

FIG. 2 is a schematic drawing showing a behavior of the beam in the laser irradiation apparatus of Example 1.

According to the above-mentioned constitution, the beam B emitted from the laser irradiation unit 30 shows the behavior of turning in the peripheral direction along the side surface of the cone in which a deflection angle of the deflection optical system 33 is a half apex angle with the central part of the deflection optical system 33 through which the optical axis of the condensing optical system 32 passes as an apex.

At this time, the focal point FP of the beam B turns on the periphery along a plane perpendicular to the optical axis with the optical axis of the condensing optical system 32 as a center.

When the laser head H is so held to an object's surface to be treated that the optical axis of the condensing optical system 32 is perpendicular to the object's surface to be treated (the surface to be irradiated) of the object O to be irradiated, and the focal point FP is held on the object's surface to be treated, then, the focal point FP of the beam B scans the object's surface to be treated while turning on the periphery.

By employing such a constitution, even when the CW laser is used, it can be prevented from irradiating the laser beam to the same portion continuously.

Incidentally, the beam diameter at the focal point FP, the turning radius or the turning speed on the surface to be irradiated, and the scanning speed of the laser head H, etc., are optionally set depending on the characteristics of the object to be irradiated or the kind of the treatment to be required.

In the following, the constitution of the air motor 100 is explained in more detail.

Figure 3:
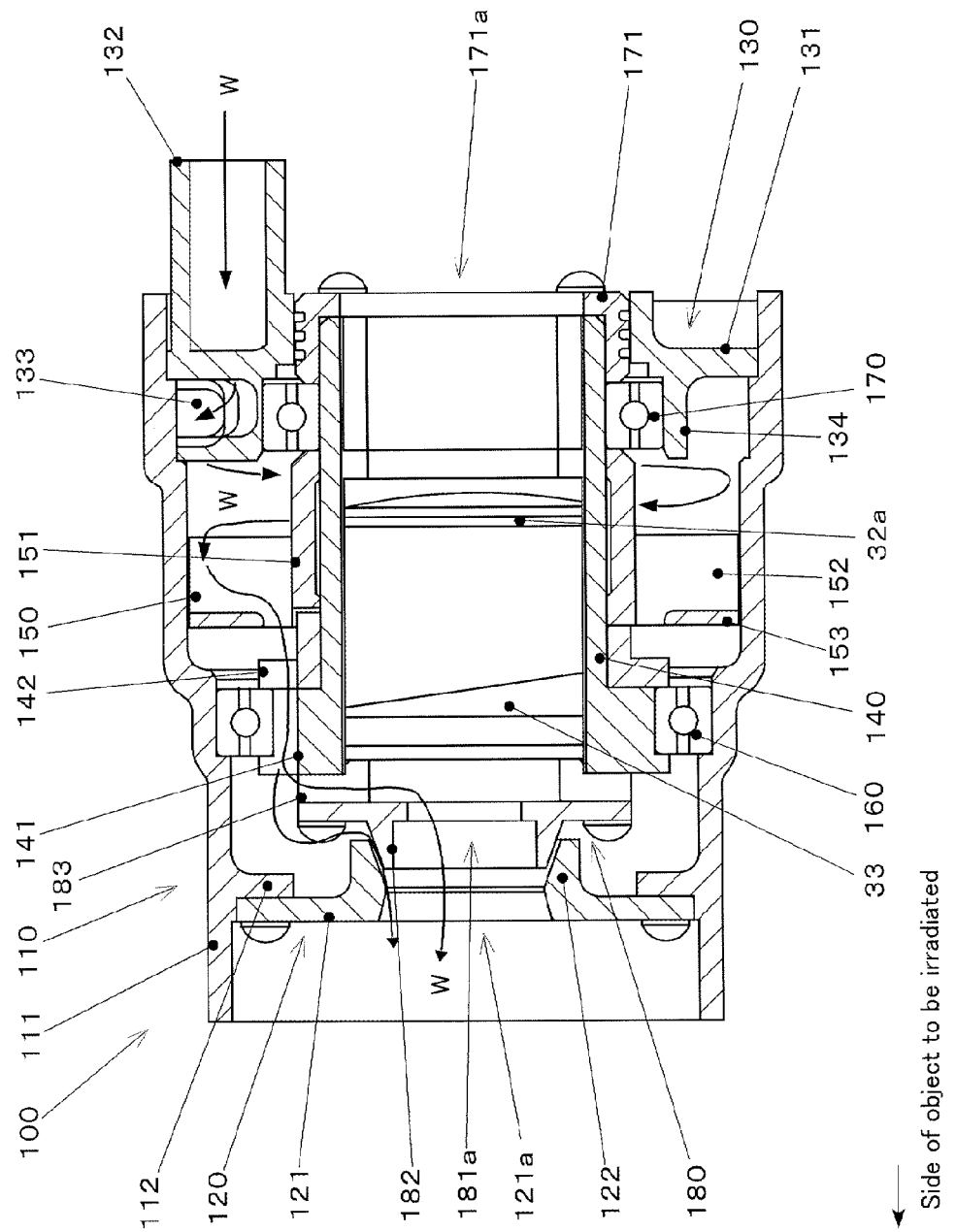
FIG. 3 is a sectional drawing of the air motor provided to the laser irradiation apparatus of Example 1.

FIG. 3 is a sectional drawing of the air motor 100 by cutting it with a plane containing the rotational central axis.

The air motor 100 is constituted by having a housing 110, a front cover 120, a rear cover 130, a lens cylinder 140, a runner 150, a front bearing 160, a rear bearing 170, and a lens cap 180, etc.

The housing 110 is a housing constituting an outer peripheral surface part of the air motor 100, and formed in a cylindrical state substantially concentric with the rotation axis.

Figure 4:
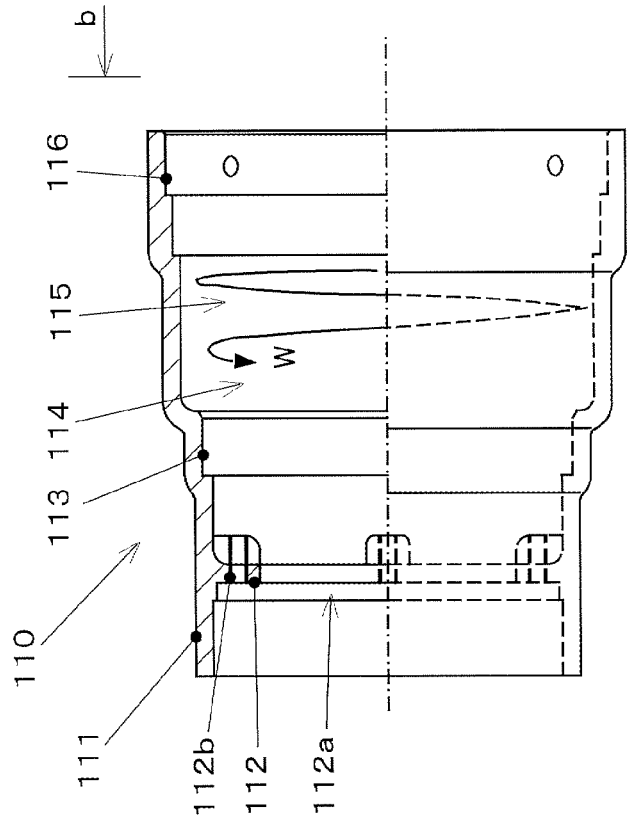
FIG. 4 is a two-directional drawing of the housing in the air motor of FIG. 3.
Figure 4:
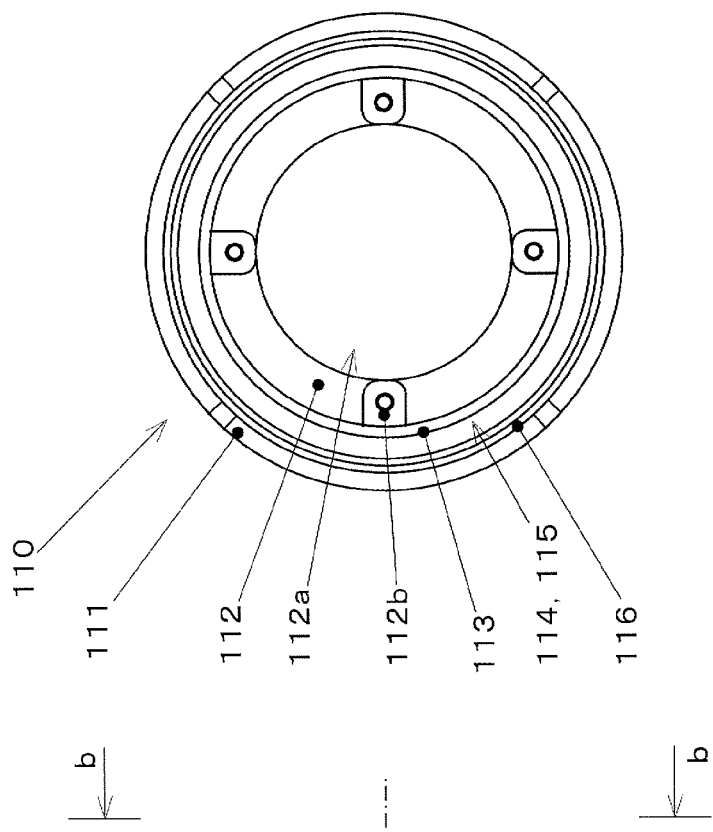

FIG. 4 is a two-directional drawing of the housing 110.

FIG. 4(a) is a partial sectional side view viewing the housing 110 from a radial direction, and FIG. 4(b) is a view viewing from the arrows at b-b part of FIG. 4(a).

The housing 110 is constituted by integrally forming a cylindrical part 111, a front cover flange 112, a front bearing holding part 113, a runner housing part 114, a swirling flow forming portion 115, a rear cover holding part 116, etc., with a resin-based material.

The cylindrical part 111 is formed in a cylindrical shape, and is a portion constituting an outer surface part of the housing 110.

The cylindrical part 111 is so formed that an outer diameter and an inner diameter are stepwise and successively expanded from the side of the object to be irradiated to a light source side (an opposite side to the side of the object to be irradiated) for positioning the respective members stored at the inside thereof to the axis direction.

The front cover flange 112 is a face part projected from the inner peripheral surface in the vicinity of the end part of the cylindrical part 111 at the side of the object to be irradiated to the inner diameter side.

The front cover flange 112 is formed in a planar shape perpendicular to the central axis (the rotation axis of the air motor 100) of the cylindrical part 111.

At the central part of the front cover flange 112, a circular opening 112a substantially concentric with the central axis of the cylindrical part 111 is formed.

At the front cover flange 112, screw hole parts 112b to which screws to be used for fixing the front cover 120 are fastened are formed.

The front bearing holding part 113 is a part which holds an outer ring of the front bearing 160.

The front bearing holding part 113 is arranged adjacent to the face part of the front cover flange 112 at the light source side.

The front bearing holding part 113 is formed by increasing the inner diameter stepwise to the region at the side of the object to be irradiated, and so constituted that the outer ring abuts this portion when the front bearing 160 is inserted thereinto from the light source side.

The runner housing part 114 and the swirling flow forming portion 115 are space parts successively arranged adjacent to the front bearing holding part 113 at the light source side.

The runner housing part 114 and the swirling flow forming portion 115 are formed as substantially the same inner diameter, and continuously provided to the rotation axis direction of the air motor.

The runner housing part 114 is a portion having a space for housing the blades 152 of the runner 150.

The swirling flow forming portion 115 is a portion having a space in which a swirling flow (an airflow having a component in which a flow rate is along the peripheral direction of the swirling flow forming portion 115) turning around the central axis of the air motor 100 is formed by an air stream jetted out from an air stream deflection nozzle 133 of a rear cover 130.

The swirling flow forming portion 115 is arranged between blades 152 of a runner 150 and a rear cover 130 in the rotation axis direction of the air motor 100, and between these materials, the cylindrical portion are so formed that it has substantially constant outer diameter and inner diameter.

Also, the inner diameters of these portions are formed in a step shape larger than the inner diameter of the front bearing holding part 113.

The rear cover holding part 116 is a portion holding an outer peripheral edge of the rear cover 130.

The rear cover holding part 116 is provided adjacent to the light source side of the swirling flow forming portion 115, and the inner diameter is formed in a step shape larger than the swirling flow forming portion 115.

The front cover 120 is a member for substantially closing the end part of the cylindrical part 111 of the housing 110 at the side of the object to be irradiated.

Figure 5:
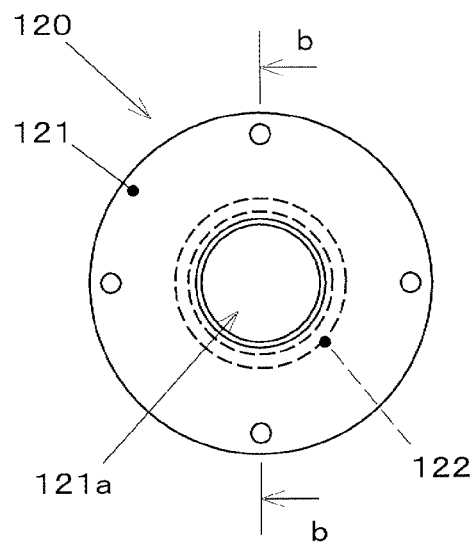
FIG. 5 is a two-directional drawing of the front cover in the air motor of FIG. 3.
Figure 5:
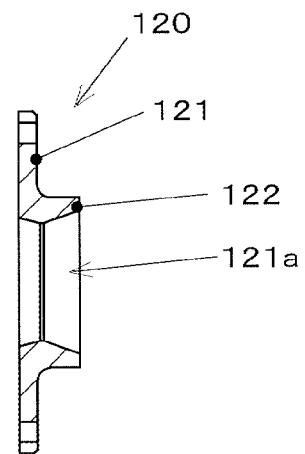

FIG. 5 is a two-directional drawing of the front cover.

FIG. 5(a) is a view viewing from the side of the object to be irradiated, and FIG. 5(b) is a sectional view viewing from the arrows at the b-b part of FIG. 5(a).

The front cover 120 is constituted by having a disk part 121, and a cylindrical part 122, etc.

The disk part 121 is formed as a discoid flat plate concentric with the central axis of the air motor 100.

The disk part 121 is inserted into the cylindrical part 111 of the housing 110 from the side of the object to be irradiated, and fastened with screws in the state of abutting the outer peripheral edge part to the front cover flange 112.

At the central part of the disk part 121, a circular opening 121a concentric with the central axis of the air motor 100 is formed.

The cylindrical part 122 is a cylindrical shaped portion projected from a peripheral part of the opening 121a of the disk part 121 to the side of the lens cylinder 140.

The inner diameter of the cylindrical part 122 is smallest at the central part in the axis direction, and formed in a tapered state so that the diameter gradually increases from the above part to the side of the object to be irradiated and the light source side.

The rear cover 130 is a member for substantially closing the end part of the cylindrical part 111 of the housing 110 at the light source side.

Figure 6:
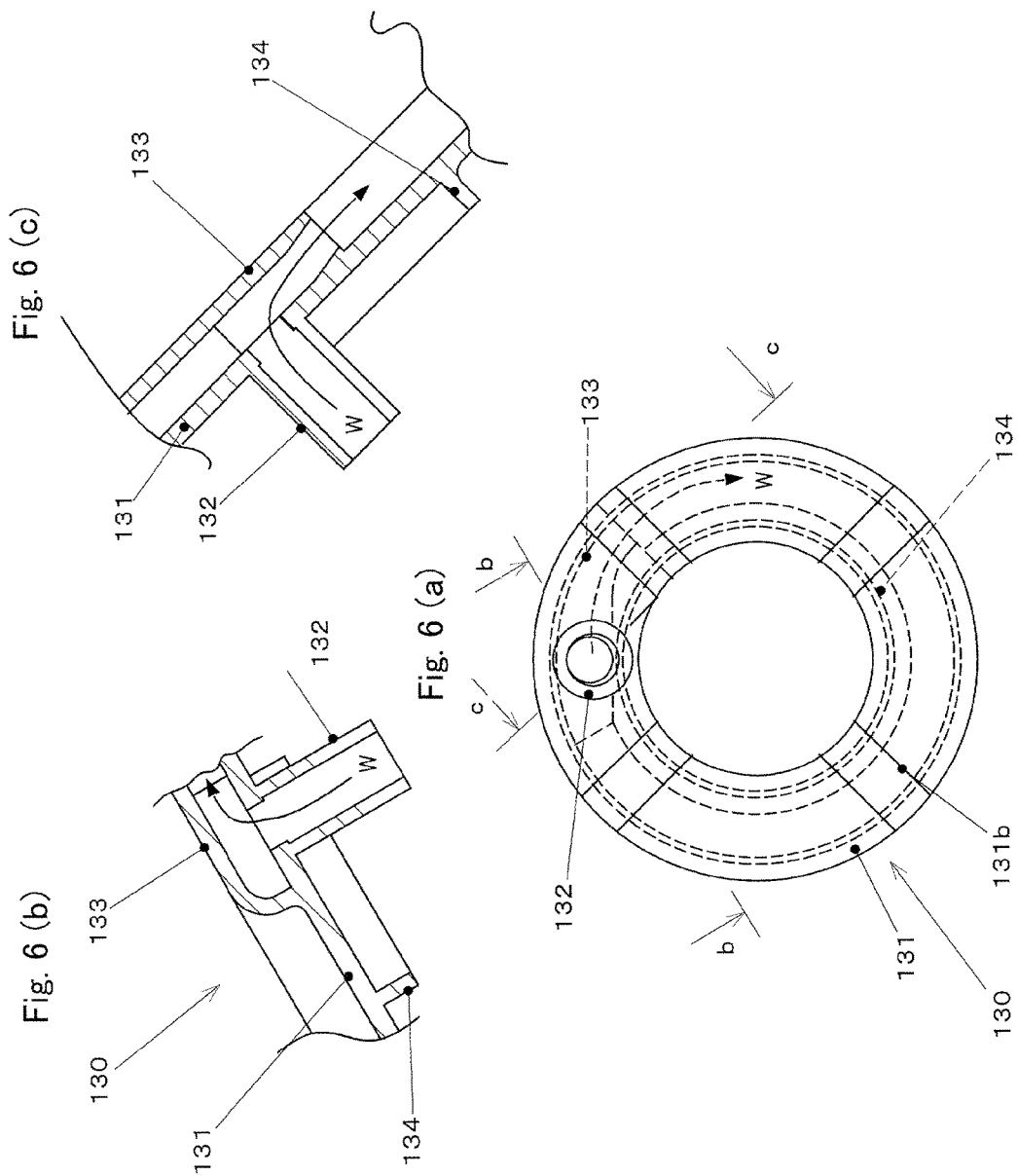
FIG. 6 is a two-directional drawing of the rear cover in the air motor of FIG. 3.

FIG. 6 is a two-directional drawing of the rear cover.

FIG. 6(a) is a view viewing from a light source side, and FIG. 6(b) and FIG. 6(c) are sectional views viewing from the arrows at the b-b part and the arrows at the c-c part of FIG. 6(a), respectively.

Figure 7:
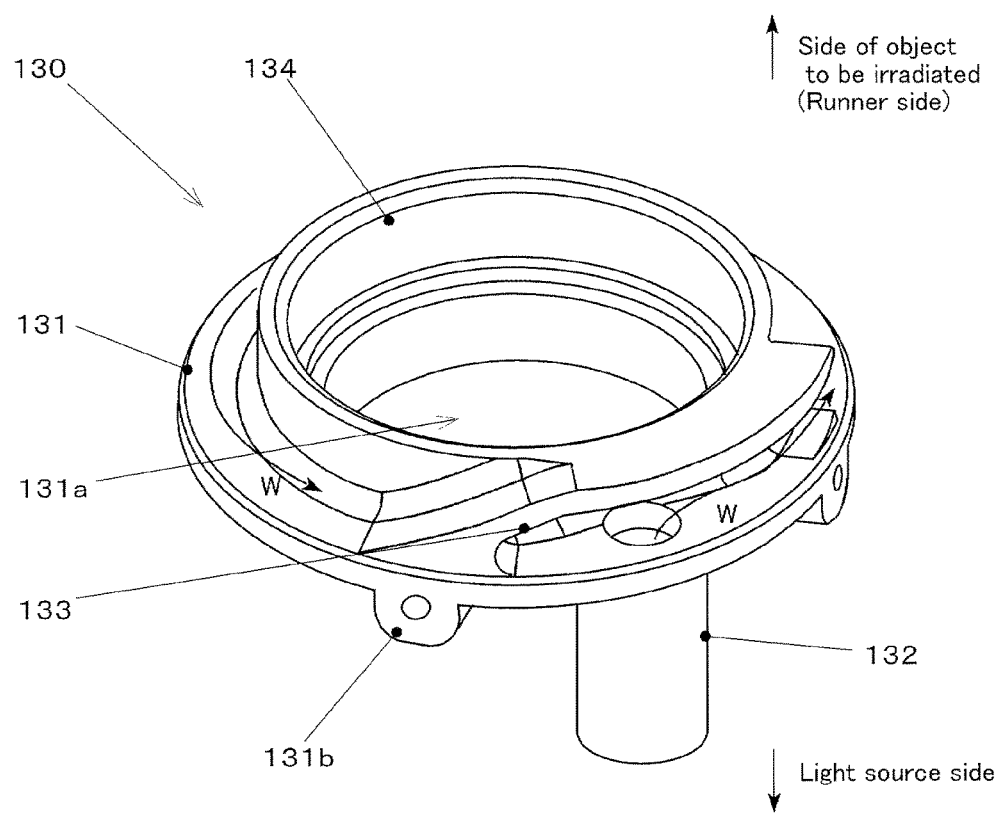
FIG. 7 is an external perspective view of the rear cover of FIG. 6 viewing from the inside of the air motor.
Figure 9:
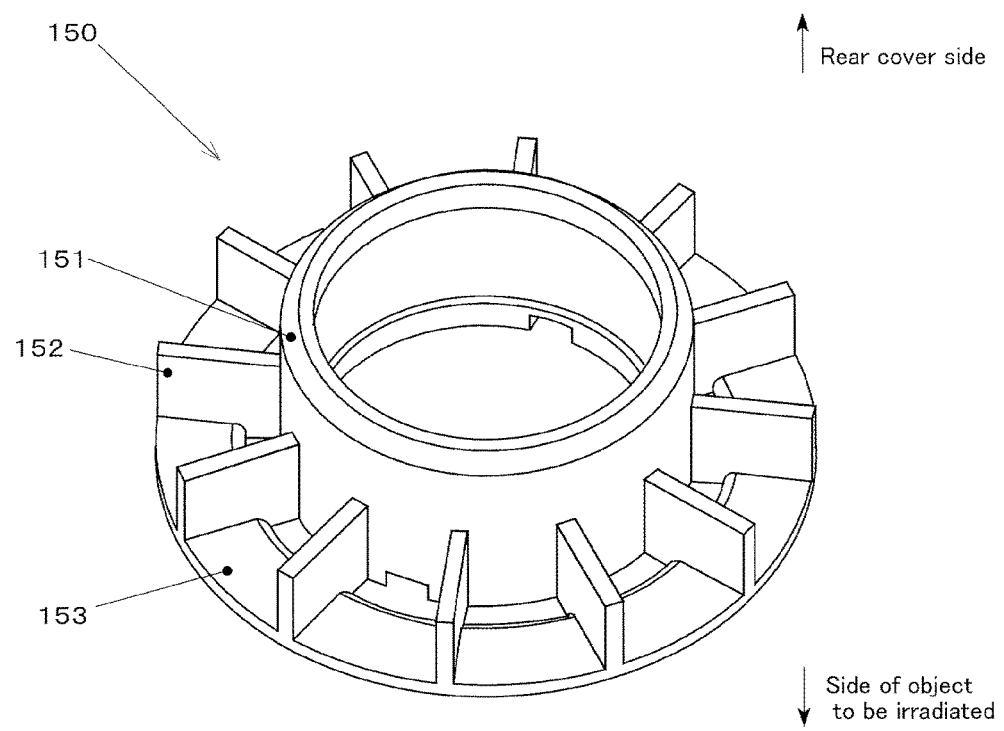
FIG. 9 is an external perspective view of the runner of FIG. 8 viewing from the rear cover side.

FIG. 7 is an external perspective view of the rear cover viewing from the inside of the air motor.

The rear cover 130 is constituted by having a disk part 131, an air introducing pipe 132, an air stream deflection nozzle 133, and a rear bearing holding part 134.

The disk part 131 is formed as a discoid flat plate concentric with the central axis of the air motor 100.

The disk part 131 is inserted into the cylindrical part 111 of the housing 110 from the light source side, and is fixed with screws inserted from the outer diameter side of the cylindrical part 111 by fastening a fastening part(s) 131b in the state that the outer peripheral edge is abutted at a step part of the rear cover holding part 116.

At the central part of the disk part 131, a circular opening 131a concentric with the central axis of the air motor 100 is formed.

The fastening parts 131b are formed by projecting from the face part of the disk part 131 at a light source side, and extended screw holes are formed along the radial direction.

The fastening parts 131b are arranged substantially equal intervals, for example, at four portions in the peripheral direction of the disk part 131.

The air introducing pipe 132 is a portion to which a hose to supply the compressed air from the compressor 60 to the air motor 100 is connected.

The air introducing pipe 132 is formed in a cylindrical shape, and formed by projecting from the face part of the disk part 131 at the light source side to the light source side.

The air stream deflection nozzle 133 is a flow passage formed by bending so that a direction of an air flow introduced into inside of the air motor 100 from the air introducing pipe 132 is changed to flow to the peripheral direction along the inner peripheral surface of the cylindrical part 111, and then, to jet out to inside of the swirling flow forming portion 115.

The airstream jetted out from the air stream deflection nozzle 133 flows along the inner peripheral surface of the cylindrical part 111 at inside of the swirling flow forming portion 115, whereby it becomes a spiral swirling flow flowing to the side of the runner 150 while turning around the central axis of the air motor 100, and flows into the blades 152 of the runner 150.

The rear bearing holding part 134 is a portion holding an outer ring of a rear bearing 170.

The rear bearing holding part 134 is a cylindrical portions formed by projecting to inside (the side of the object to be irradiated) of the air motor 100 from an inner peripheral edge part of the opening 131a of the disk part 131.

The outer ring of the rear bearing 170 is press-fitted into the inner diameter side of the rear bearing holding part 134 and held.

The lens cylinder 140 is a cylindrical shaped member storing the deflection optical system 33 of the laser irradiation unit 30, and a part of the lenses 32a of the condensing optical system 32.

The lens cylinder 140 and the runner 150 constitute a main part of the rotor of the air motor 100 of Example 1. The lens cylinder 140 and the runner 150 are cooperated to relatively rotate around the central axis to the other portions of the air motor 100 and the portions of the laser head H other than the air motor 100, and to rotate the polarizing optical system 33 of the laser irradiation unit 30.

The lens cylinder 140 can be formed by using, for example, an aluminum-based alloy, etc., having high thermal conductivity to dissipate heat generated in the laser irradiation unit 30 to the outside.

Also, when the cost and lightweight are important, it may be formed by a resin-based material.

The lens cylinder 140 is inserted into inside of the housing 110 so that it is concentric with the rotation axis of the air motor 100, and is relatively rotatably held to the housing 110 by the front bearing 160 and the rear bearing 170.

At the end part of the lens cylinder 140 at the side of the object to be irradiated, a bearing holding part 141 to hold an inner ring of the front bearing 160 is provided.

The bearing holding part 141 is so formed that it is radially projected to the outer diameter side from the end part of the lens cylinder 140 at the side of the object to be irradiated.

The bearing holding part 141 is abutted to the inner peripheral surface and the end surface at the side of the object to be irradiated of an inner ring of the front bearing 160.

An end surface of an inner ring of the front bearing 160 at a light source side is held by a bearing collar 142.

The bearing collar 142 is an annular member sandwiched between an end surface of the cylindrical portion 151 at the side of the object to be irradiated of the runner 150, and the bearing holding part 141.

At the bearing collar 142, an engagement means is optionally provided so that it does not relatively rotate to the lens cylinder 140 and the runner 150.

The bearing holding part 141 and the bearing collar 142 are to hold the front bearing 160 by the comb-like holding part formed by radially projecting to the outer diameter side.

According to the above-mentioned constitution, as shown in FIG. 3, an air flow W flown out from a gap between an outer peripheral surface of the cylindrical portion 151 of the runner 150 and an inner peripheral edge part of an annular part 153 is capable of passing through the gaps of the comb of the bearing holding part 141 and the bearing collar 142 and flows from the inner diameter side of the front bearing 160 to the side of the front cover 120.

The runner 150 is an impeller (a turbine) generating a driving force for rotationally driving the lens cylinder 140 by receiving the swirling flow formed in the swirling flow forming portion 115 of the housing 110.

The runner 150 is integrally formed, for example, by a resin-based material.

FIG. 8 is a two-directional drawing of the runner.

FIG. 8(*a*) is a view viewing from the side of the object to be irradiated, and FIG. 8(*b*) is a sectional view viewing from the arrows at the b-b part of FIG. 8(*a*).

The runner 150 is constituted by having a cylindrical part 151, blades 152, and an annular part 153, etc.

The cylindrical part 151 is a portion into which the lens cylinder 140 is inserted.

The cylindrical part 151 is fixed at the middle part in the axis direction of an outer peripheral surface part of the lens cylinder 140.

The blades 152 are formed by projecting from an outer peripheral surface of the cylindrical part 151 to the outer diameter side, and to generate a rotational force by receiving the swirling flow.

The blades 152 is formed in a rectangular flat plate substantially along the plane surface which is along the radial direction of the cylindrical part 151 and the axis direction.

The blades 152 are provided with a plural number dispersing in the peripheral direction of the cylindrical part 151, and are arranged radially when viewed them from the rotation axis direction of the air motor 100.

As shown in FIG. 3, the end edge of the blades 152 at the side of the rear cover 130 is arranged opposing to the air stream deflection nozzle 133 of the rear cover 130 with a certain distance between them in the rotation axis direction of the air motor 100.

The annular part 153 is an annular member to connect the regions at the outer diameter sides at the end edge parts of a plurality of the blades 152 at the side of the object to be irradiated to each other.

The annular part 153 is formed as a ring state plate in which an opening concentric with the rotation axis has been formed at the central part of a disc which is formed in a flat plate shape along the flat surface perpendicular to the rotation axis of the air motor 100.

The front bearing 160 and the rear bearing 170 are bearings which rotatably hold the lens cylinder 140 to the housing 110.

As the front bearing 160 and the rear bearing 170, for example, a rolling bearing such as single row deep groove ball bearings may be used.

The front bearing 160 is to hold the edge part of the lens cylinder 140 at the side of the object to be irradiated.

An inner ring of the front bearing 160 is held by the bearing holding part 141 and the bearing collar 142 of the above-mentioned lens cylinder 140.

An outer ring of the front bearing 160 is held by the front bearing holding part 113 of the housing 110.

The rear bearing 170 is to hold the edge part of the lens cylinder 140 at a light source side.

Into an inner ring of the rear bearing 170, the lens cylinder 140 is inserted.

The inner peripheral surface of the inner ring of the rear bearing 170 is abutted to an outer peripheral surface of the lens cylinder 140.

An end surface of the inner ring of the rear bearing 170 at the side of the object to be irradiated is abutted to an end surface of the cylindrical portion 151 of the runner 150 at the light source side.

An end surface of the inner ring at the light source side of the rear bearing 170 is held by a bearing cap 171 which is covered at the end part of the lens cylinder 140 at the light source side and fastened.

At the central part of the bearing cap 171, an opening 171*a* through which the laser beam is passed is formed.

An outer peripheral surface of the outer ring and an end surface at the light source side of the rear bearing 170 are held by the rear bearing holding part 134 of the rear cover 130.

The lens cap 180 is a ring state member provided at the edge part of the lens cylinder 140 at the side of the object to be irradiated for the purpose of protecting the optical system, etc.

FIG. 10 is a two-directional drawing of a lens cap.

FIG. 10(*a*) is a drawing viewing from the side of the object to be irradiated. FIG. 10(*b*) is a sectional drawing viewing from the arrows at b-b part of FIG. 10(*a*). FIG. 10(*c*) is a drawing viewing from the arrows at c-c part of FIG. 10(*b*).

The lens cap 180 is constituted by having a disk part 181, a cylindrical part 182, and a fitting part(s) 183, etc.

The disk part 181 is formed in a flat plate shape along the flat surface perpendicular to the rotation axis of the air motor 100, and a circular opening 181*a* concentric with the rotation axis is formed at the central part.

The cylindrical part 182 is a cylindrical shaped portion formed projecting from a peripheral part of the opening 181*a* of the disk part 181 to the side of the object to be irradiated.

The outer diameter of the cylindrical part 182 is gradually changed in a tapered shape so that the side of the protruded end part is small.

According to the above-mentioned constitution, as shown in FIG. 3, an outer peripheral surface of the cylindrical part 182 and the inner peripheral surface of the cylindrical part 122 of the front cover 120 are arranged opposing to each other with a minute distance.

The fitting part(s) 183 is/are a portion(s) which is/are a base part(s) for fastening the lens cap 180 to the lens cylinder 140.

The fitting part(s) 183 is/are formed by projecting from the disk part 181 in the vicinity of an outer peripheral edge thereof to the light source side, and fastened to the end surface part of the lens cylinder 140 at the side of the object to be irradiated.

The fitting part(s) 183 is/are provided in the peripheral direction of the disk part 181 at equal intervals with, for example, four portions.

The distance between the respective fitting parts 183 is so formed that an air flow W is capable of passing therethrough.

In the following, the surface treatment of a structure by the laser irradiation apparatus 1 of Example 1 mentioned above is explained.

The laser irradiation apparatus 1 of Example 1 is used, for example, to peel off a coating film at the surface of a structure such as a bridge made of a steel, etc., installed outdoors, and to carry out a substrate treatment for recoating by removing rust, etc., but the object to be irradiated and the kind or use of the treatment are not particularly limited.

First, the laser irradiation apparatus 1 is carried to a construction site, and a power source is connected to each of a laser oscillator 10, a dust sucking device 50 and a compressor 60.

Then, a laser head H is held so that the focal point FP of a beam B substantially coincides with the surface of the object O to be irradiated, and compressed air is supplied from the compressor 60 to an air motor 100.

The air flow W supplied to the air motor 100 is introduced into inside of the air motor 100 through an air introducing pipe 132 of a rear cover 130, deflected by an air stream deflection nozzle 133 in substantially along the tangential direction of an outer peripheral edge of a rear cover 130, and jetted out to inside of a swirling flow forming portion 115 of a housing 110.

According to this procedure, at the inside of the swirling flow forming portion 115, along an inner peripheral surface of a cylindrical part 111, a spiral swirling flow which flows to the side of a runner 150 while turning to the clockwise direction viewing from the side of the rear cover 130 is formed.

The swirling flow flows to the side of a runner housing part 114, and at that portion, it hits blades 152 of the runner 150, and generates a rotational driving force to the blades 152 for rotating the runner 150 and a lens cylinder 140 by the pressure.

At this time, by employing the constitution that the blades 152 are separately arranged in the axial direction to the air stream deflection nozzle 133, the jet stream exiting from the air stream deflection nozzle 133 does not directly hit the blades 152, so that a noise that may occur if such a constitution is employed can be suppressed.

After generating the rotational driving force to the blades 152, the air flow W is successively passed through a space between an annular part 153 of the runner 150 and a cylindrical part 151, a space of combs between a bearing holding part 141 and a bearing collar 142 of a lens cylinder 140, and further, a space (a space of the fitting parts 183) between an end surface of the lens cylinder 140 and a disk part 181 of a lens cap 180, and jetted out from an opening 181a and a cylindrical part 182 of the disk part 181 of the lens cap 180 to the side of the object to be irradiated.

Also, part of the air flow W is jetted out to the side of the object to be irradiated through a gap between an outer peripheral surface of the cylindrical part 182 of the lens cap 180, and an inner peripheral surface of a cylindrical part 122 of a front cover 120.

Incidentally, for example, if heat generation when the respective optical elements (a lens, a wedge prism, etc.) of a laser irradiation unit 30 are received the laser beam, and burnout or erosion, etc., accompanied thereby can be a problem(s), by extracting a part of the air flow W, a gas flow passage to blow it to the optical element for cooling may be formed.

According to this constitution, the optical element is protected by cooling to elongate the lifetime of the parts, whereby the running cost of the apparatus can be reduced.

In Example 1, it is desired to perform a feedback control so that a rotational speed of the air motor 100 can be made close to a predetermined target speed by providing a rotation sensor for detecting the rotational speed of a rotor (rotating portions such as the lens cylinder 140, the runner 150, etc.) of the air motor 100.

The rotational speed of the air motor 100 can be controlled, for example, by adjusting an output of a compressor 60 to change a discharge amount or a discharge pressure, or by using a pressure regulator to adjust a supply pressure to the air motor 100.

Also, the rotational speed of the air motor 100 may be controlled by, for example, a mechanical controlling means such as a centrifugal governor, etc.

In addition, when the rotation sensor does not detect rotation of the air motor 100 (stopping), or under abnormal conditions where the rotation number of the air motor 100 is out of the predetermined range, it is preferred to provide a safety device which stops the laser oscillator 10 to cease the irradiation for protecting the object to be irradiated or the laser irradiation apparatus 1 itself.

After starting rotation of the air motor 100 with a desired rotational speed stably, generation of the laser beam is started from the laser oscillator 10 to start irradiation of the beam B from the laser head H to the object O to be irradiated, and the laser head H is relatively moved to the object O to be irradiated while maintaining a space with the object O to be irradiated to start scanning of the object O to be irradiated.

Such a movement of the laser head H may be carried out by manual operations, for example, holding the laser head H by an operator, or may be carried out automatically, for example, by using a conveying means such as an XY stage and a robot arm, etc.

At this time, by operating a dust sucking device 50, a fragment of a coating film peeled off by the irradiation of the beam B, rust, dust, smoke, etc., are sucked from a space between an inner cylinder 41 of a housing 40 and an outer cylinder 42, and recovered and processed.

Incidentally, during rotation of the air motor 100, the air stream (the exhaust) after driving the runner 150 is jetted out from the central part or the periphery of the lens cap 180 to the side of the object to be irradiated, so that the peeled foreign substance can be prevented from flowing into inside of the air motor 100 or the respective optical element sides.

In addition, by removing the foreign substance in an optical path of the beam B, an energy reached to the object to be irradiated can be increased and the processing ability can be improved.

As explained above, according to Example 1, the deflection optical system can be driven with a high speed of, for example, 10,000 rpm or higher by the small-sized and light-weighted structure, and the laser irradiation apparatus which can cope with heat generation of the optical system can be provided.

Such an air motor 100 is lightweight since a magnetic substance or a coil which is heavy weight such as an electromagnetic motor is not required to be provided, and further, an amount of heat generated by the air motor 100 itself is such an extent that it can be ignorable. In addition, even if inside of the housing 40 becomes a high temperature by generation of heat due to the laser irradiation unit 30, no lowering in performance due to deterioration of the magnetic substance, etc., occurs, so that the performance can be ensured.

Also, an air flow W of an air always supplied from outside during the operation is flown to the inside of the air motor 100, so that it is possible to cool the air motor 100, and depending on the necessity, if the exhaust is introduced into the respective optical elements of the laser irradiation unit 30, cooling of the optical elements can be achieved whereby, for example, it is not necessary to provide a cooling device such as a water jacket for water cooling, etc.

EXAMPLE 2

Next, the laser irradiation apparatus of Example 2 to which the present invention has been applied is explained.

As for substantially the same portion as in Example, the same reference numeral is attached and explanation thereof is omitted, and different points are mainly explained.

Figure 11:
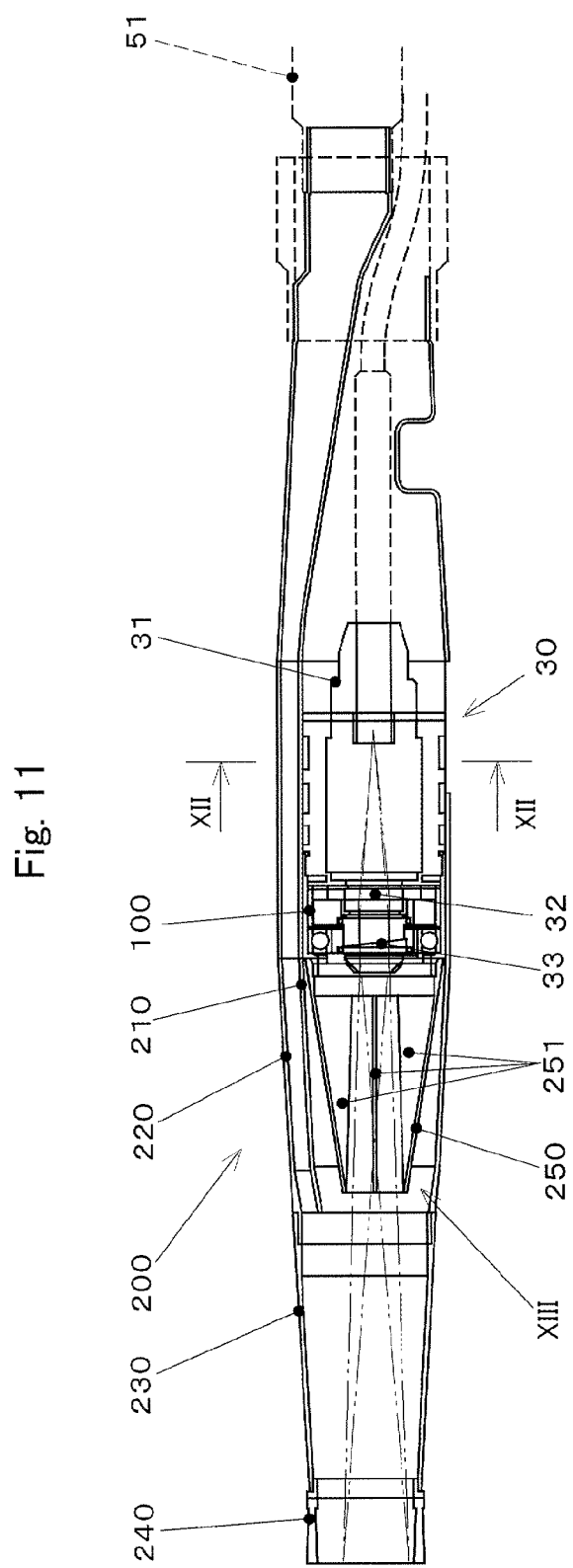
FIG. 11 is a sectional drawing of the laser irradiation apparatus of Example 2 to which the present invention has been applied.

FIG. 11 is a sectional drawing of the laser irradiation apparatus of Example 2.

The laser irradiation apparatus of Example 2 stores, in place of the housing 40 of Example 1, a laser irradiation unit 30 and an air motor 100 are stored at the inside of a housing 200 explained in the following.

The air motor 100 is constituted by substantially the same as the air motor 100 of Example 1, except that the rear bearing 170 in Example 1 is omitted for light weighting, and a rotation portion is held by a single bearing corresponding to the front bearing 160.

The housing 200 is constituted by having an inner cylinder 210, an outer cylinder 220, a front pipe 230, a collar 240, and an inner duct 250, etc.

The inner cylinder 210 is formed substantially in a cylindrical shape, and is a portion storing a laser irradiation unit 30 and the air motor 100 at the inner diameter side.

An edge part of the inner cylinder 210 at the side of the object to be irradiated (left side in FIG. 11) is so formed that it is projected to the side of the object to be irradiated than the air motor 100.

The outer cylinder 220 is formed substantially in a cylindrical shape, and is a portion storing the inner cylinder 210 at the inner diameter side.

Figure 12:
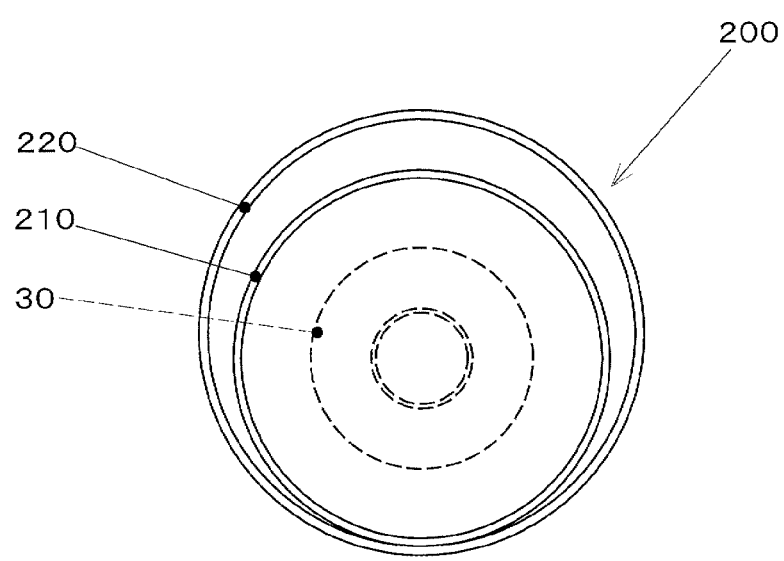
FIG. 12 is a schematic sectional drawing viewing from the arrow direction of the XII-XII part of FIG. 11.

FIG. 12 is a schematic sectional view viewing from the arrow direction at the XII-XII part of FIG. 11.

An inner diameter of the outer cylinder 220 is provided larger than an outer diameter of the inner cylinder 210.

The inner cylinder 210 is eccentrically arranged to the outer cylinder 220 so that a part of an outer peripheral surface is to be contacted with an inner peripheral surface of the outer cylinder 220.

A space part between the outer peripheral surface of the inner cylinder 210 and the inner peripheral surface of the outer cylinder 220 is used for sucking a floating material such as a fragment of a coating film, rust, dust, etc., as in the housing 40 of Example 1.

An edge part of the outer cylinder 220 opposite to the side of the object to be irradiated is connected to the dust sucking device through a suction hose 51.

An edge part of the outer cylinder 220 of the object to be irradiated is so arranged that it is extended to the side of the object to be irradiated as compared to an edge part of the inner cylinder 210.

The front pipe 230 is a cylindrical shaped portion projected from an end part of the outer cylinder 220 at the side of the object to be irradiated to the side of the object to be irradiated.

The front pipe 230 is formed substantially concentric with the outer cylinder 220, and formed in a tapered state so that the side of the object to be irradiated is a small diameter.

A collar 240 is an annular (short cylindrical state) member provided by projecting from an edge part of the front pipe 230 at the side of the object to be irradiated to the object to be irradiated.

The collar 240 is arranged substantially concentric with the front pipe 230.

The inner duct 250 is a cylindrical shaped member provided by projecting from an outer peripheral edge at an end surface of the air motor 100 at the side of the object to be irradiated to the side of the object to be irradiated.

FIG. 13 is a part drawing of the inner duct, FIG. 13(a) is an enlarged view of the XIII part of FIG. 11, and FIG. 13(b) is a view viewing from the arrow direction at the b-b part of FIG. 13(a). Incidentally, FIG. 13(a) is a sectional view viewing from the arrow direction at the a-a part of FIG. 13(b).

The inner duct 250 is a cylindrical shape substantially concentric with the inner cylinder 210, and so formed in a tapered shape that an edge part at the side of the object to be irradiated is smaller diameter than an edge part of the air motor 100 side.

As shown in FIG. 11, a space between an outer peripheral surface of the inner duct 250 and an inner peripheral surface of the inner cylinder 210 is set to expand toward the side of the object to be irradiated.

An edge part of the inner duct 250 at the side of the object to be irradiated is arranged to be offset slightly toward the air motor 100 side than an edge part of the inner cylinder 210.

At the inner duct 250, a stabilizer 251 is formed.

The stabilizer 251 is a flat plate-shaped and rib-shaped rectification fin formed by projecting from the inner peripheral surface of the inner duct 250 to the inner diameter side substantially along a radial direction.

The stabilizer 251 is extended to the central axis (substantially concentric with the rotational central axis of the air motor 100) of the inner duct 250.

The protruded end part (an edge part at the most inner diameter side) of the stabilizer 251 is so formed as to substantially along a straight line, and is so arranged that it is faced to the beam B with a minute space when the beam B is turned and passed through the stabilizer 251 with the most adjacent thereto.

A projected amount (rib height) of the stabilizer 251 from the inner peripheral surface to the inner diameter side of the inner duct 250 is so set that it is continuously reduced from the air motor 100 side to the side of the object to be irradiated.

At the edge part of the inner duct 250 at the side of the object to be irradiated, the projected amount of the stabilizer 251 is substantially zero, and a planar shape of the stabilizer 251 viewing from a peripheral direction of the inner duct 250 is formed substantially triangular shape.

According to Example 2 explained as mentioned above, it can be prevented from forming a swirling flow by the exhaust of the air motor along the inner peripheral surface of the inner duct 250, and it can be prevented from being sucked the foreign substance to the air motor 100 side caused by a relatively low pressure of the region in the vicinity of a shaft center as compared with that of an outer peripheral side caused by the swirling flow, whereby contamination or deterioration of the lens, etc., can be suppressed.

MODIFIED EXAMPLE

The present invention is not limited to Examples explained above, and various modification or alteration is possible, which are also within the technical scope of the present invention.
(1) Structures, materials, shapes, numbers, disposition, etc., of the respective members constituting the laser irradiation apparatus are not limited to the above-mentioned Examples, and may be optionally changed.
(2) In Examples, an air is utilized as a gas for driving the air motor, but it is not limited thereto and may be used other gases, for example, an incombustible gas such as nitrogen and carbon dioxide, etc., an inert gas such as helium, neon, argon, etc., a reactive gas which promotes removal of the coated film, etc.

(3) Uses of the laser irradiation apparatus are not limited only to removal of the coating film as described in Examples and a substrate treatment for recoating but it can be also utilized, for example, for a substrate treatment at open inspection of a large-sized tank, a surface modification treatment such as a welding pretreatment, etc., of a large-sized mechanical equipment, etc., removal of stain or rust of an equipment at a port and harbor, etc.

Also, stain, scribbling, etc., attached to the surface of concrete can be removed. Further, it can be also utilized for removal of a radiation-contaminated paint or an attached material.

(4) In Examples, it employs the constitution that the housing of the laser head is made a double cylinder structure, the laser is irradiated from the inner cylinder and an air is jetted out, and floating materials are sucked from the outer cylinder, but the constitution of the housing or the dust sucking mechanism is not limited thereto.

In addition, when it is made a double cylinder structure, a positional relation (one of the inner cylinder and the outer cylinder is projected to the side of the object to be irradiated to the other, etc.) at the tip end parts of the inner cylinder and the outer cylinder is not particularly limited.

Further, a sliding auxiliary means may be provided to assist for moving the laser head with the object to be irradiated at a predetermined interval. As such a sliding auxiliary means, for example, a rolling body such as a tire, a roller, etc., or a brush-like, a curtain-like member, etc., formed by a material having flexibility can be used.

(5) In Examples, a hollow type material utilizing a swirling flow is used as the air motor, but a form of the air motor is not particularly limited. For example, an air motor of a vane type, etc., may be used.

(6) In Examples, a compressor is used as the gas supplying source, but it is not limited thereto and a blower or a cylinder may be used.

(7) In Examples, for exchanging the deflection optical system 33, the air motor 100 is made detachable from the laser head H, but it is not limited to make the entire air motor 100 detachable and, for example, the rotor (the lens cylinder 140, the runner 150, etc.) alone which is a rotating portion may be made detachable from the air motor 100. Further, for example, a portion alone at which the polarizing optical system 33 is provided may be made detachable from the lens cylinder 140.

EXPLANATION OF REFERENCE NUMERALS

| | | | |
|---|---|---|---|
| O | Object to be irradiated (object to be treated) | | |
| H | Laser head | | |
| B | Beam | FP | Focal point |
| 10 | Laser oscillator | 20 | Fiber |
| 30 | Laser irradiation unit | 31 | Fiber connecting portion |
| 32 | Condensing optical system | 32a | Lenz |
| 33 | Deflection optical system | 40 | Housing |
| 41 | Inner cylinder | 42 | Outer cylinder |
| 50 | Dust sucking device | 51 | Suction hose |
| 60 | Compressor | 61 | Supply hose |
| 100 | Air motor | | |
| 110 | Housing | 111 | Cylindrical portion |
| 112 | Front cover flange | 112a | Opening |
| 113 | Front bearing holding part | 114 | Runner housing part |
| 115 | Swirling flow forming portion | 116 | Rear cover holding part |
| 120 | Front cover | 121 | Disk part |
| 121a | Opening | 122 | Cylindrical portion |
| 130 | Rear cover | 131 | Disk part |
| 131a | Opening | 131b | Fastening part |
| 132 | Air introducing pipe | 133 | Air stream deflection nozzle |
| 134 | Rear bearing holding part | | |

EXPLANATION OF REFERENCE NUMERALS -continued

| | | | |
|---|---|---|---|
| 140 | Lens cylinder | 141 | Bearing holding part |
| 142 | Bearing collar | | |
| 150 | Runner | 151 | Cylindrical portion |
| 152 | Blade | 153 | Annular part |
| 160 | Front bearing | | |
| 170 | Rear bearing | 171 | Bearing cap |
| 171a | Opening | | |
| 180 | Lens cap | 181 | Disk part |
| 181a | Opening | 182 | Cylindrical portion |
| 183 | Fitting part | | |
| 200 | Housing (Example 2) | 210 | Inner cylinder |
| 220 | Outer cylinder | 230 | Front pipe |
| 240 | Collar | 250 | Inner duct |
| 251 | Stabilizer | | |

The invention claimed is:

1. A laser irradiation apparatus that irradiates an object, the apparatus comprising:
   a condensing optical system for condensing a laser beam generated by a laser oscillator at a predetermined focal point,
   a deflection optical system for deflecting the laser beam generated from the condensing optical system with a predetermined deflection angle,
   a driving means for rotationally driving the deflection optical system around a rotation axis provided substantially in parallel to an optical axis of the condensing optical system,
   wherein the driving means has an air motor which converts an energy possessed by a gas supplied from a gas supplying source into a rotational force, and
   an air guiding means for guiding an exhaust of the air motor to an optical element contained in at least one of the deflection optical system and the condensing optical system.

2. The laser irradiation apparatus according to claim 1, wherein,
   the air motor has a swirling flow forming portion which forms a swirling flow swirling around the rotation axis by the gas supplied from the gas supplying source, and
   a rotor which is rotationally driven by the swirling flow,
   a central part including the rotational central axis of the swirling flow forming portion and the rotor is made hollow, and
   the laser beam passes through the central part of the swirling flow forming portion and the rotor.

3. The laser irradiation apparatus according to claim 2, wherein at least part of the deflection optical system is provided at an inner diameter side of the hollow-formed rotor.

4. The laser irradiation apparatus according to claim 3, wherein at least part of the air motor and the deflection optical system is detachable as an integrated unit from other portions.

5. The laser irradiation apparatus according to claim 2, wherein,
   the rotor has a plural number of blades which are arranged radially and generate a rotational force by receiving the swirling flow, and
   the blades are arranged separately from the swirling flow forming portion in the rotation axis direction.

6. The laser irradiation apparatus according to claim 2, wherein the air motor includes an optical path through which the laser beam passes and the exhaust of the air motor is discharged into a space part nearer to the side of the object to be irradiated than the deflection optical system.

7. The laser irradiation apparatus according to claim 1, wherein the apparatus has a suction means for sucking a material to be removed which generates when the laser beam is irradiated to the object to be irradiated.

8. The laser irradiation apparatus according to claim 1, wherein the apparatus has a rotation speed sensor for detecting a rotation speed of the air motor, and
an irradiation inhibiting means for inhibiting irradiation of the laser beam when the rotation speed is out of a predetermined normal range.

9. The laser irradiation apparatus according to claim 1, wherein,
the apparatus has a rotation speed sensor for detecting a rotation speed of the air motor, and
a controlling means for feedback controlling the gas supplying source so that the rotation speed is close to a target rotation speed previously set.

10. The laser irradiation apparatus according to claim 1, wherein,
the apparatus has a duct which is formed in a cylindrical shape projected to the deflection optical system at the side of the object to be irradiated, the laser beam irradiated from the deflection optical system being passed through an inner diameter side thereof and the exhaust of the air motor being introduced therein, and
a plural number of stabilizers projected from an inner peripheral surface of the duct to the inner diameter side and extended along a central axis direction of the duct are formed along a peripheral direction of the duct.

11. The laser irradiation apparatus according to claim 10, wherein,
the duct is inserted into an inner diameter side of an outer cylinder formed in a cylindrical shape, and
the apparatus has a suction means for sucking the material to be removed that is generated at a time of irradiating the laser beam to the object to be irradiated from a gap between an outer peripheral surface of the duct and an inner peripheral surface of the outer cylinder.

12. The laser irradiation apparatus according to claim 3, wherein the rotor has a plural number of blades which are arranged radially and generate a rotational force by receiving the swirling flow, and
the blades are arranged separately from the swirling flow forming portion in the rotation axis direction.

13. The laser irradiation apparatus according to claim 4, wherein the rotor has a plural number of blades which are arranged radially and generate a rotational force by receiving the swirling flow, and
the blades are arranged separately from the swirling flow forming portion in the rotation axis direction.

14. The laser irradiation apparatus according to claim 3, wherein the air motor includes an optical path through which the laser beam passes and the exhaust of the air motor is discharged into a space part nearer to the side of the object to be irradiated than the deflection optical system.

15. The laser irradiation apparatus according to claim 4, wherein the air motor includes an optical path through which the laser beam passes and the exhaust of the air motor is discharged into a space part nearer to the side of the object to be irradiated than the deflection optical system.

16. The laser irradiation apparatus according to claim 5, wherein the air motor includes an optical path through which the laser beam passes and the exhaust of the air motor is discharged into a space part nearer to the side of the object to be irradiated than the deflection optical system.

17. The laser irradiation apparatus according to claim 1, wherein,
the air motor comprises a housing, a front cover, a rear cover, a lens cylinder, a runner comprising blades, and a lens cap,
an air stream of the gas supplied from the gas supplying source flowing into the blades drives the runner in rotation, and
the air stream after driving the runner, as the exhaust of the air motor, is jetted out from the lens cap to a side of the object to be irradiated to thereby prevent peeled foreign substance from flowing into inside of the air motor.

18. The laser irradiation apparatus according to claim 1, wherein,
the air motor comprises a housing, a front cover, a rear cover, a lens cylinder, a runner comprising blades, and a lens cap,
an air stream of the gas supplied from the gas supplying source flowing into the blades drives the runner in rotation, and
the air stream after driving the runner, as the exhaust of the air motor, is jetted out from the lens cap to a side of the object to be irradiated to thereby prevent peeled foreign substance from flowing to sides of the optical element.

19. The laser irradiation apparatus according to claim 1, wherein,
the air motor comprises a housing, a front cover, a rear cover, a lens cylinder, a runner comprising blades, and a lens cap,
an air stream of the gas supplied from the gas supplying source flowing into the blades drives the runner in rotation, and
the air stream after driving the runner, as the exhaust of the air motor, is jetted out from the lens cap, via an exhaust path through a central part and a periphery of the lens cap, to a side of the object to be irradiated to thereby prevent peeled foreign substance from flowing into inside of the air motor or to sides of the optical element.

20. The laser irradiation apparatus according to claim 1, wherein,
the air motor comprises a housing, a front cover, a rear cover, a lens cylinder, a runner comprising blades, and a lens cap,
an air stream of the gas supplied from the gas supplying source flowing into the blades drives the runner in rotation, and
the air stream after driving the runner, as the exhaust of the air motor, is jetted out to a side of the object to be irradiated, via an exhaust path through a gap between an outer peripheral surface of a cylindrical part of the lens cap and an inner peripheral surface of a cylindrical part of the front cover.

* * * * *